United States Patent [19]

Sovey et al.

[11] 4,349,424
[45] Sep. 14, 1982

[54] ION SPUTTER TEXTURED GRAPHITE

[75] Inventors: James S. Sovey, Strongsville; Ralph Forman, Rocky River; Arthur N. Curren, North Ridgeville; Edwin G. Wintucky, Lakewood, all of Ohio

[73] Assignee: The United States of America as represented by the Administrator of the National Aeronautics and Space Administration, Washington, D.C.

[21] Appl. No.: 264,378

[22] Filed: May 15, 1981

[51] Int. Cl.³ ............................................. C23C 15/00
[52] U.S. Cl. ................................. 204/192 E; 313/106; 313/107; 315/5.38
[58] Field of Search .................. 204/19 ZE; 313/106, 313/107; 315/5.38

[56] References Cited

U.S. PATENT DOCUMENTS

| | | | |
|---|---|---|---|
| 3,540,989 | 11/1970 | Webb | 204/168 |
| 3,555,334 | 1/1971 | Van de Goor | 313/107 |
| 3,619,286 | 11/1971 | Gutuojer | 427/113 |
| 3,813,282 | 5/1974 | Masotti et al. | 204/19 ZE |
| 4,277,721 | 7/1981 | Kosmahl | 315/5.38 |

Primary Examiner—Veronica O'Keefe
Attorney, Agent, or Firm—Norman T. Musial; John R. Manning; Gene E. Shook

[57] ABSTRACT

A specially textured surface of pyrolytic graphite exhibits extremely low yields of secondary electrons and reduced numbers of reflected primary electrons after impingement of high energy primary electrons.

An ion flux having an energy between 500 eV and 1000 eV and a current density between 1.0 mA/cm² and 6.0 mA/cm² produces surface roughening or texturing which is in the form of needles or spines.

Such textured surfaces are especially useful as anode collector plates in high efficiency electron tube devices.

5 Claims, 3 Drawing Figures

ION SPUTTER TEXTURED GRAPHITE

Origin of the Invention

The invention described herein was made by employees of the United States Government and may be manufactured and used by or for the Government for governmental purposes without the payment of any royalties thereon or therefor.

Description

Technical Field

This invention relates to ion sputter texturing. The invention is particularly directed to texturing pyrolytic graphite to reduce both the secondary electron emission yield and the number of reflected primary electrons. The textured graphite is used in high efficiency electron tube devices.

Broadband, high power traveling wave tube microwave amplifiers are used in military electronic countermeasure and communications satellite applications where high electrical power efficiency is an important requirement. Electron beams with energies on the order of 10 keV are used to amplify the microwave signals. The electrical efficiency of a traveling wave tube is substantially improved by the use of a multistage depressed collector of the type shown in U.S. Pat. No. 3,702,951 to H. Kosmahl.

Electrons entering the multistage depressed collector are slowed by a retarding electric field and strike the collector plates at reduced energies which are experimentally observed to be generally in the range of 500 eV to 1000 eV. The overall traveling wave tube efficiency depends strongly on the collector efficiency. An important factor influencing collector efficiency is the effectiveness of the electrode surfaces in absorbing electrons. Significant energy losses can occur through emission of electrons from the surface as a result of electron bombardment. The electron emission process, called secondary electron emission, includes both electrons reflected elastically without loss of energy (reflected primaries) and electrons which undergo inelastic collisions with the lattice and are emitted at lower energies (true secondaries). Reflected primary electrons generally constitute 5 to 10 percent of the secondary electron emission. A measure of secondary electron emission is the secondary electron emission yield which is defined as the ratio of the total number of emitted electrons to the number of incident primary electrons. For large electron absorption and consequently optimum collector efficiency, one obviously needs collector electrode surfaces with low secondary electron emission yields.

Previous techniques used to limit secondary electron emission yield include the proper choice of appropriate materials, such as tantalum carbide, titanium carbide, and soot for the collector. Carbon black, or soot, is one of the lowest known secondary electron emitting materials. Soot has poor adhesion and lacks the mechanical integrity necessary for space applications. However, carbon in the form of pyrolytic graphite is very attractive as a collector electrode material for space applications. This material is relatively light in weight and mechanically strong with suitable electrical properties. It also has both high planar thermal conductivity and high thermal emittance for the enhancement of collector cooling.

Other methods for limiting secondary electron emission yields include surface roughening techniques such as grit blasting and preparing metal blacks by evaporating gold, silver, or copper in relatively high residual pressure of various gases. Certain disadvantages were observed with these prior art methods. For example, the secondary electron emission yields were relatively high, being greater than 0.5. Also, relatively high secondary electron yields at low incident electron energies of 300 eV to 700 eV were observed. In addition, there is degradation of secondary electron yields after processing, manufacturing, or exposure to oxygen environments. For example, beryllium is oxidized to beryllium oxide.

Background Art

U.S. Pat. No. 3,540,989 to Webb discloses a process for reducing secondary electron emission wherein an electrode is exposed to an inert, ionizable gas and thereafter, a carbon containing gas is introduced. The second gas ionizes and a carbon film forms on the elctrode.

Gutnajer Pat. No. 3,619,286 discloses a process wherein a graphite electrode is coated with pyrolytic graphite. Prior to coating, a graphite mold is exposed to an argon atmosphere at high temperature to induce carbonization of the binder.

DISCLOSURE OF THE INVENTION

Surfaces of pyrolytic graphite collector plates and the like are roughened by ion sputter texturing. The textured surfaces exhibit extremely low secondary emission yields and reduced numbers of reflected primary electrons.

Such surfaces are used on anode collector plates in high efficiency electron tube devices. The textured surfaces are especially useful on the plates of an electrostatic collector for charged particles of the type shown in U.S. Pat. No. 3,702,951.

BEST MODE FOR CARRYING OUT THE INVENTION

Figure 1:
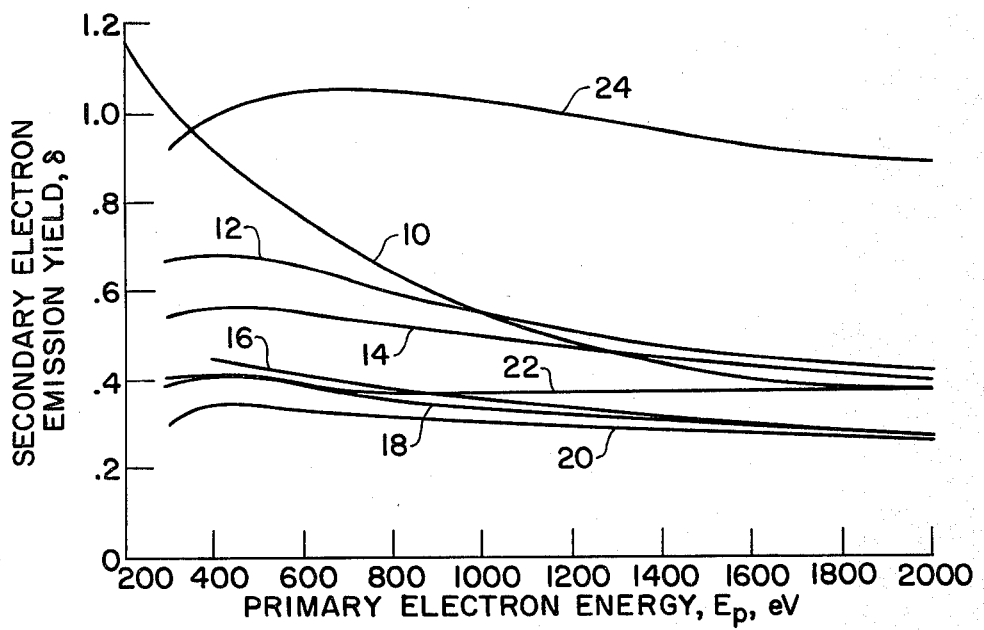
FIG. 1 is a graph of the secondary electron emission yields of sputter-textured pyrolytic graphite surfaces plotted against primary electron energy.

According to the present invention the pyrolytic graphite to be textured is argon ion bombarded by various techniques. Certain of the bombardments were by the argon ion beams from an electron bombardment ion source of the type developed from electric propulsion technology.

Pyrolytic graphite samples consisting of circular discs, 21 mm in diameter and 2 mm thick, were textured by various techniques. The crystalline orientation was the same as for collector electrode applications with the flat surfaces parallel to the direction of high strength and high thermal conductivity. This is known as the "a" direction. The pyrolytic graphite was of high purity with a maximum 0.01 percent ash content as determined in combustion tests.

Pyrolytic graphite develops a natural surface texture under ion bombardment without requiring seeding material. The sputter-texturing parameters are ion energy, ion current density, and sputter duration. Their values depend on which argon ion bombardment technique is employed.

One sample was sputter-textured for 13.7 hours in a radio frequency generated plasma at an average argon ion energy of 1800 eV and a current density of approximately 0.7 mA/cm$^2$. The resulting surface microstructure consisted typically of scattered clumps of micron-size toothlike protuberances. This sample formed the basis for curves 12 in FIG. 1 and 32 in FIG. 2.

In a second technique the surfaces were sputter-textured by a normally incident 750 eV ion beam from a 30 cm-diameter argon ion source. Such an ion source is described in "Advances in Electronics and Electron Physics" by H. R. Kaufman, vol. 36, pages 365-373. Beam extraction was accomplished by a dished, two-grid ion optics system. Such a system is described in AIAA paper No. 76-1017 entitled "A 30 cm Diameter Argon Ion Source".

The electron bombardment ion source is located in a vacuum facility which is sufficiently large to minimize back sputtered facility material from contaminating the pyrolytic graphite. The vacuum facility is maintained at a pressure of about $4 \times 10^{-5}$ torr during the operation of the ion source. Neutralization of the ion beam is achieved by secondary electrons released by ion bombardment of the vacuum facility walls.

The surface of the pyrolytic graphite sample to be textured is positioned normal to the ion beam at a location of about 20 centimeters from the ion source. Based on current ion source technology, it is contemplated that ion beam textured graphite surfaces may be easily obtained with dimensions up to $0.5 \times 0.5$ meters.

A short exposure to the ion beam of 0.5 hours at an ion current density of 1.1 mA/cm$^2$ produced a surface microstructure consisting of a dense array of uniformly-sized small cones. This sample supplied the information for curve 14 in FIG. 1 and 34 in FIG. 2. A longer exposure of 4.6 hours also at 1.1 mA/cm$^2$ produced a noticeably different cone structure in which the cones are of much larger size, randomly distributed and of varying peak heights on the order of microns. This sample supplied the data for curves 16 in FIG. 1 and 36 in FIG. 2. Ion beam sputter-texturing for 4.7 hours at a lower ion current density of 0.5 mA/cm$^2$ resulted in a similar cone-like microstructure, but the cones were both smaller and less clustered.

Both ion beam and RF plasma techniques necessitated that sputter-texturing be performed at low ion current densities of 1.1 mA/cm$^2$ or less. Because pyrolytic graphite is an inherently low sputter yield material, the corresponding sputter-etch rates were low.

To enhance the sputter-etch rate, the 30-cm diameter argon ion source was converted to a DC triode sputtering configuration which provided for much higher ion current densities. In this approach, the ion beam focus grids were replaced by an electrically isolated plate with an orifice having nearly the same geometry as the sample holder. The pyrolytic graphite target was then biased negative relative to the discharge plasma potential. Ion current densities of 5 mA/cm$^2$ were readily obtained in this manner with current densities of 10 mA/cm$^2$ or higher possible.

The samples were sputter-textured at ion energies of 500 and 1000 eV. A high ion current density of 5 mA/cm$^2$ bombardment produced a much more dense cone-like microstructure than the low current density techniques. The structure formed at 500 eV which produced the data for curves 18 in FIG. 1 and 38 in FIG. 2 consisted of tall slender cones or spires randomly distributed in a dense background of smaller cones. Varying the etch time from 4 to 19 hours did not significantly alter the surface microstructure.

At 1000 eV, the structure was a more uniform, dense array of tall, thin spires less than 1 $\mu$m diam., 5-10 $\mu$m high and appeared similar for etch times of 6 and 18.5 hours. This sample formed the basis for curves 20 in FIG. 1 and 40 in FIG. 2. The photomicrograph shown in FIG. 3 shows this surface at an etch time of 6 hours.

Measurements of secondary electron emission and reflected primary electron characteristics were made with an Auger cylindrical mirror analyzer in a high-vacuum chamber at pressures below $1.33 \times 10^{-7}$ N/m$^2$ ($10^{-9}$ torr). The primary electrons were normally incident on the sample surface at energies ranging from 200 to 2000 eV.

Surface contaminants, such as absorbed gaseous impurities, may alter the secondary electron emission levels. To ensure clean surfaces, it is necessary to first bake out the samples. The samples were heated to temperatures above 850° C. both by resistance heaters mounted on the sample holder and by electron bombardment. Temperatures were monitored by a platinum vs platinum - 13% rhodium thermocouple embedded inside the disk. A residual gas analyzer indicated when the surfaces were free of gaseous impurities.

Soot (carbon black) has exceptionally reproducible secondary electron emission characteristics and is useful as a standard, control surface. One half of each disk was coated with soot after careful removal of the sputter texture. Measurements of electron emission characteristics were made successively on both soot and the test surface during the same run.

The secondary electron emission yield, $\delta$, defined as the ratio of secondary electrons emitted to primary electrons incident per unit time, is experimentally determined for a given primary energy, $E_p$, from measurements of the primary electron current, $I_p$, and the current passing through the sample to ground, $I_T$, according to $$(E_p) = I_p - I_T / I_p$$

The quantity $I_p - I_T$ is the total emitted secondary electron current, which is collected by the surrounding grounded vacuum chamber.

The reflected primary electrons are detected by an energy analyzer technique in which only those electrons emitted with energies equal to the primary electron energy are selectively focused and collected. The resulting analyzer output signal, although representative of the magnitude of the reflected primary electron current, is not by itself meaningful unless it is indexed relative to similar measurements with a standard surface. A useful parameter, which enables meaningful comparison between the reflected primary electron characteristics of various surfaces, is the "reflected primary electron index," defined here as the ratio of the analyzer output signal amplitude for the test surface at a given primary energy to that for soot at a primary energy of 1000 eV.

FIG. 1 is a plot of secondary electron emission yield, versus primary electron energy, $E_p$, for seven surfaces. Five of the surfaces are pyrolytic graphite. One surface is soot, and one surface is copper for comparison. The first curve 10 is for untextured pyrolytic graphite while the second curve 12 is for the surface textured by the RF plasma.

Curves 14 and 16 are for the ion beam textured surfaces for 0.5 hours and 4.6 hours as previously described. Curves 18 and 20 are for DC triode sputtered samples as previously described. For comparison, a typical $\delta$ vs. $E_p$ curves 22 for soot and 24 for smooth copper are also presented.

Figure 2:
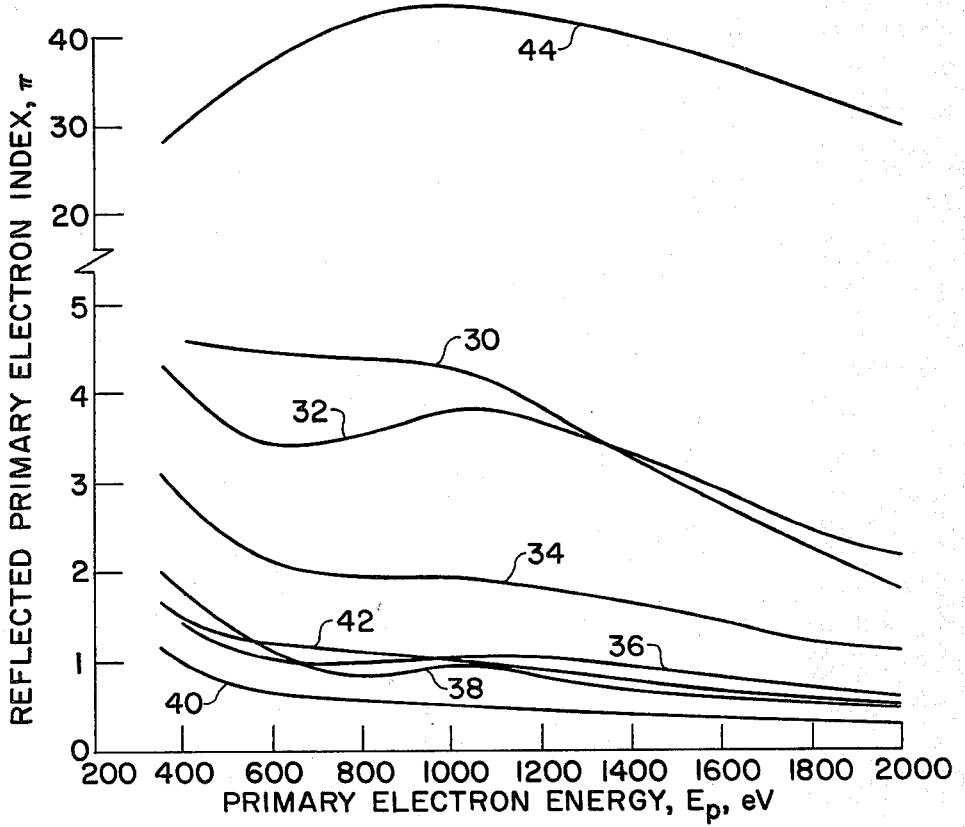
FIG. 2 is a graph of the primary electron indices of sputter-textured pyrolytic graphite surfaces plotted against primary electron energy.
Figure 3:
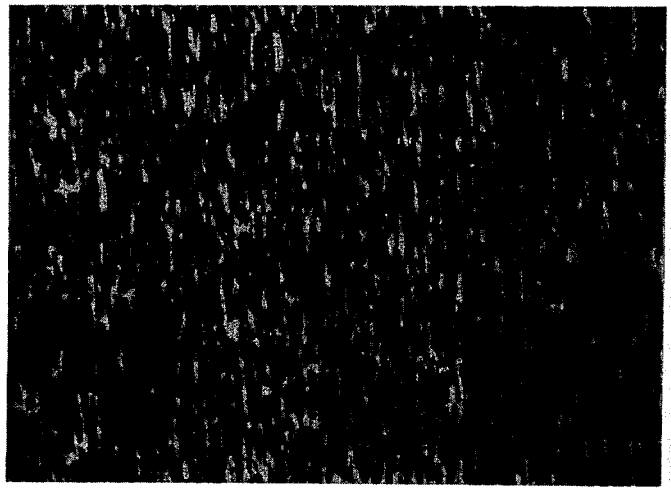
FIG. 3 is a photomicrograph at a magnification of 1,120 showing a pyrolytic graphite surface textured in accordance with the invention.

FIG. 2 is a plot of the reflected primary electron index, $\pi$, versus primary electron energy, $E_p$, for the same surfaces as in FIG. 1. Curves 30 to 44 in FIG. 2 correspond to curves 10 to 24, respectively, in FIG. 1.

The emission characteristics, $\delta$ and $\pi$, in FIGS. 1 and 2 correlate well with the height and density of the surface microstructures. In progressing from the relatively smooth surface of untextured pyrolytic graphite to the dense, tall spire-like structure, $\delta$ and $\pi$ are in general correspondingly reduced. The higher and denser microstructures appear to provide more effective electron traps.

For $E_p < 1000$ eV, all of the sputter-textured surfaces reduce $\delta$ and $\pi$ below that of untextured pyrolytic graphite. For $E_p > 1000$ eV, both $\delta$ and $\pi$ for the sparse structure are about equal to or slightly greater than for untextured pyrolytic graphite. The $\delta$ for the surface with the small cone structure is about the same as for untextured surface for $E_p > 1000$ eV, but $\pi$ is somewhat reduced.

For $E_p < 500$ eV, the measured $\delta$ is approximately the same as for soot, whose electron emission characteristics are among the lowest observed for any material. The $\pi$ for surface 16 is slightly less than that of soot whereas $\pi$ for surface 18 is slightly more. Both surfaces 16 and 18 have some tall cone-like microstructure. For $E_p$ in the range of 500 to 1000 eV, the measured $\delta$ and $\pi$ for both surfaces are approximately equal to or lower than for soot. For $E_p > 1000$ the same two surfaces, 16 and 18 have $\delta$ lower than soot, whereas $\pi$ is nearly equal to or slightly greater than soot.

Both $\delta$ and $\pi$ for the surface with the dense, tall spire-like microstructure are well below those of soot over the entire range of $E_p$. In the primary electron energy range of 500 to 1000 eV, which is of considerable interest for collector applications, sample 20, 40 shows reductions in $\delta$ and $\pi$ of at least 45 and 83 percent, respectively, when compared to untextured pyrolytic graphite.

FIGS. 1 and 2 demonstrate that sputter texturing effectively suppresses secondary electron emission from pyrolytic graphite surfaces. A dense, tall, thin spire-like microstructure shown in FIG. 3, readily obtained at ion energies of 1000 eV and ion current densities of 5 mA/cm$^2$, is the most effective. The secondary electron emission from such a surface is observed to be lower than that of soot, whose secondary emission is among the lowest of any material. At a primary electron energy of 1000 eV, the secondary electron emission yield of smooth Cu is about 350 percent greater than the lowest value obtained for sputter-textured pyrolytic graphite. The reflected primary electron index of smooth Cu is a factor of 80 greater. If the secondary electron emission yield is reduced to 0.3, which appears possible with sputter-textured pyrolytic graphite, the collector efficiency could be improved by as much as 4 percent over that of smooth copper.

Similar surface features are obtained on both pyrolytic and isotropic graphite. This yields flexibility in choice of the graphite material for various applications. It is further contemplated that the texture will also exist on graphite fiber, cloth, or mesh.

In addition to electron tubes of the type shown in U.S. Pat. No. 3,702,951, the textured graphite is useful in plasma devices or plasma probes where secondary electron emission is undesirable.

While the preferred embodiment of the invention has been described, it is evident that various modifications may be made to the invention without departing from the spirit thereof or the scope of the subjoined claims.

We claim:

1. A method of treating the surface of a pyrolytic graphite electrode plate for use in a multistage depressed collector to attain low secondary emission yields and reduced numbers of reflected primary electrons from the collector comprising the steps of
    placing said plate in a vacuum environment of about $4 \times 10^{-5}$ torr, and
    exposing at least one surface of said plate to ions having an energy between about 500 eV and 1000 eV and an ion beam current density between about 1.0 mA/cm$^2$ and 6.0 mA/cm$^2$ for about 4 to 6 hours.

2. A method of treating the surface of a pyrolytic graphite electrode plate as claimed in claim 1 wherein an ion flux is produced by an argon ion beam.

3. A method of treating the surface of a pyrolytic graphite electrode as claimed in claim 2 wherein the ion flux is produced by a D.C. plasma triode system.

4. A method of treating the surface of a pyrolytic graphite electrode as claimed in claim 3 wherein the argon ions have a current density of about 5 mA/cm$^2$ and is substantially uniform over the surface of the plate.

5. A method of treating the surface of a pyrolytic graphite electrode plate as claimed in claim 4 wherein the energy of said beam is about 1000 eV.

* * * * *